(12) United States Patent
Billman et al.

(10) Patent No.: US 12,067,627 B1
(45) Date of Patent: *Aug. 20, 2024

(54) SYSTEMS AND METHODS FOR DYNAMIC INSURANCE PREMIUMS

(71) Applicant: United Services Automobile Association (USAA), San Antonio, TX (US)

(72) Inventors: Bradly Jay Billman, San Antonio, TX (US); Ewan Richard Grantham, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/932,956

(22) Filed: Sep. 16, 2022

Related U.S. Application Data

(63) Continuation of application No. 16/812,789, filed on Mar. 9, 2020, now Pat. No. 11,488,252, which is a continuation of application No. 13/768,692, filed on Feb. 15, 2013, now Pat. No. 10,657,597.

(60) Provisional application No. 61/600,225, filed on Feb. 17, 2012.

(51) Int. Cl.
  *G06Q 40/08* (2012.01)

(52) U.S. Cl.
  CPC .................... *G06Q 40/08* (2013.01)

(58) Field of Classification Search
  CPC ....................................... G06Q 40/08
  USPC ...................................... 705/3–44
  See application file for complete search history.

(56) References Cited

U.S. PATENT DOCUMENTS

| | | |
|---|---|---|
| 5,289,778 A | 3/1994 | Romine |
| 5,668,310 A | 9/1997 | Parkman |
| 5,797,134 A | 8/1998 | McMillan |
| 6,092,629 A | 7/2000 | Bohnert |
| 6,233,563 B1 | 5/2001 | Jefferson |
| 7,228,218 B2 | 6/2007 | Burke, Jr. |
| 7,343,306 B1 | 3/2008 | Bates |
| 7,542,915 B2 | 6/2009 | Kendrick |
| 7,659,827 B2 | 2/2010 | Gunderson |
| 7,672,680 B1 | 3/2010 | Lee |
| 7,844,477 B2 | 11/2010 | Bonissone |
| 7,865,378 B2 | 1/2011 | Gay |
| 7,895,062 B2 | 2/2011 | Bonissone |

(Continued)

FOREIGN PATENT DOCUMENTS

| | | |
|---|---|---|
| EP | 0700009 A2 | 3/1996 |
| JP | 2002259708 A1 | 9/2002 |
| WO | 2005083605 A1 | 9/2005 |

OTHER PUBLICATIONS

"Driver Privacy at risk when telematics data stored in the cloud: Researchers", Insurance Journal Wells Media Group, Inc. Apr. 20, 2017.*

(Continued)

*Primary Examiner* — Frantzy Poinvil
(74) *Attorney, Agent, or Firm* — BakerHostetler

(57) ABSTRACT

Systems and methods monitor at least one of a first amount of time a vehicle operator is in active control of a vehicle during a period and a second amount of time that the vehicle operates autonomously during the period. The systems and methods further calculate an insurance rate based on the first amount of time and the second amount of time.

20 Claims, 7 Drawing Sheets

(56) References Cited

U.S. PATENT DOCUMENTS

| | | | |
|---|---|---|---|
| 7,899,688 B2 | 3/2011 | Bonissone | |
| 7,937,278 B1 | 5/2011 | Cripe | |
| 8,027,853 B1 | 9/2011 | Kazenas | |
| 8,352,118 B1 | 1/2013 | Mittelsteadt | |
| 8,406,957 B2 | 3/2013 | Kim | |
| 8,489,140 B2 | 7/2013 | Weiner | |
| 8,577,703 B2 | 11/2013 | McClellan | |
| 8,799,032 B2 | 8/2014 | Fernandes | |
| 8,892,451 B2 | 11/2014 | Everett | |
| 8,930,231 B2 | 1/2015 | Bowne | |
| 9,037,394 B2 | 5/2015 | Fernandes | |
| 9,355,423 B1 | 5/2016 | Slusar | |
| 9,390,451 B1* | 7/2016 | Slusar | G07C 5/0841 |
| 9,623,876 B1 | 4/2017 | Slusar | |
| 9,679,487 B1* | 6/2017 | Hayward | G06Q 40/08 |
| 9,858,621 B1 | 1/2018 | Konrardy | |
| 9,995,584 B1 | 6/2018 | Kanevsky | |
| 10,055,794 B1 | 8/2018 | Konrardy | |
| 10,176,525 B2 | 1/2019 | Gordon | |
| 10,475,127 B1 | 11/2019 | Potter | |
| 10,657,597 B1 | 5/2020 | Billman | |
| 10,664,917 B1* | 5/2020 | Wasserman | G01C 21/3685 |
| 10,902,521 B1 | 1/2021 | Kanevsky | |
| 10,946,862 B1* | 3/2021 | Bischoff | G07C 5/008 |
| 10,984,479 B1* | 4/2021 | Kyne | H04L 67/12 |
| 11,017,479 B2 | 5/2021 | Thompson | |
| 11,247,670 B1 | 2/2022 | Fields | |
| 11,270,374 B1* | 3/2022 | Rao | G06Q 30/0207 |
| 11,354,616 B1* | 6/2022 | Fields | G06Q 10/0639 |
| 11,560,177 B1* | 1/2023 | Fields | G08G 1/09623 |
| 2002/0042770 A1 | 4/2002 | Slyke | |
| 2002/0128882 A1* | 9/2002 | Nakagawa | G06Q 30/02 705/4 |
| 2003/0167191 A1 | 9/2003 | Slabonik | |
| 2003/0182165 A1 | 9/2003 | Kato | |
| 2004/0064337 A1 | 4/2004 | Nakahara | |
| 2005/0071202 A1* | 3/2005 | Kendrick | G06Q 40/08 705/4 |
| 2005/0139649 A1 | 6/2005 | Metcalf | |
| 2006/0095301 A1 | 5/2006 | Gay | |
| 2006/0226224 A1 | 10/2006 | Henry | |
| 2006/0267530 A1 | 11/2006 | Burke | |
| 2006/0276958 A1 | 12/2006 | Crumbaugh | |
| 2007/0061173 A1 | 3/2007 | Gay | |
| 2007/0255601 A1 | 11/2007 | Heydon | |
| 2007/0282638 A1* | 12/2007 | Surovy | G06Q 40/08 705/4 |
| 2008/0021800 A1 | 1/2008 | Wilmes | |
| 2008/0065427 A1 | 3/2008 | Helitzer | |
| 2008/0133430 A1 | 6/2008 | Horowitz | |
| 2008/0162193 A1 | 7/2008 | Voggenauer | |
| 2009/0024419 A1 | 1/2009 | McClellan | |
| 2009/0070153 A1 | 3/2009 | Chien | |
| 2010/0131303 A1 | 5/2010 | Collopy | |
| 2010/0131304 A1 | 5/2010 | Collopy | |
| 2010/0268619 A1 | 10/2010 | Farmer | |
| 2012/0072244 A1 | 3/2012 | Collins | |
| 2012/0083960 A1 | 4/2012 | Zhu | |
| 2012/0221358 A1 | 8/2012 | Pallesen | |
| 2013/0179198 A1 | 7/2013 | Bowne | |
| 2014/0149148 A1 | 5/2014 | Luciani | |
| 2014/0279707 A1* | 9/2014 | Joshua | G06Q 30/0283 701/1 |
| 2015/0170287 A1* | 6/2015 | Tirone | G06Q 40/08 705/4 |
| 2015/0187019 A1 | 7/2015 | Fernandes | |
| 2016/0188303 A1 | 6/2016 | Rodrigues De Araujo | |
| 2016/0189304 A1 | 6/2016 | Todasco | |
| 2016/0248095 A1 | 8/2016 | Kurata | |
| 2016/0375908 A1 | 12/2016 | Biemer | |
| 2018/0075538 A1 | 3/2018 | Konrardy | |
| 2019/0100216 A1 | 4/2019 | Volos | |
| 2019/0213684 A1 | 7/2019 | Sundar Singh | |
| 2019/0288917 A1 | 9/2019 | Ricci | |
| 2022/0244736 A1* | 8/2022 | Konrardy | G06Q 40/08 |

OTHER PUBLICATIONS

Neogi, Saikat "Telematics, safe driving may help you pay less motor insurance premium soon; here's how", Financial Express [New Delh] Aug. 11, 2017.*

"Allstate Insurance Home Page", http://www.allstate.com/drivewise/main.aspx, (Oct. 7, 2011 accessed), 1 pg.

"Changing Insurance, One Mile", Contingencies, (Nov./Dec. 2003), p. 34-38.

"OnStar/GMAC Insurance Pay-As-You-Go Insurance: "The Low-Mileage Discount" Insurance Discount Helps Onstar Users Drive Less, Save More", (online] (retrieved on Apr. 19, 2011]. Retrieved from the Internet: <URL: http://liveweb.web.archive.org/http://lowmileagediscount.com/what-is-payg/lmd-defined .asp >, 2 pgs.

"Pay Monthly 'Pay As You Drive' Motor Insurance", (Online]. Retrieved from the Internet: <http://web.archive.org/web/20100902234223/http:/www.breakdowncover.org/car-insurance/pay-as-you-qo>, (Accessed Nov. 11, 2011 ), 2 pgs.

"Pay per use Insurance with GALILEO", GI ROADS Club, Intelligent Roads, Issue 2, (May 2006), 2 pqs.

"Pay-As-You-Drive Vehicle Insurance, Converting Vehicle Insurance Premiums Into Use-Based Charges", Online TDM Encyclopedia—PAYD Vehicle Insurance, (Nov. 24, 2008), 11 pgs.

"The Aftermarket's Role in Telematics Future", (Online]. Retrieved from the Internet: <http://www.aftermarket.org/Resources/TelematicsExecutiveSummary.aspx>, (Accessed Nov. 11, 2011), 2 pgs.

"Usage-Based Insurance", http://en.wikipedia.org/wiki/Usage-based_insurance, (Oct. 7, 2011 accessed), 8 pqs.

Anonymous, "Video: GMAC Insurance Reveals Ways for Drivers to Cut Costs on the Road; Insurer Provides Tips to Reduce Transportation Costs and Offers Low-Mileage Discount", PR Newswire, (Jul. 1, 2008).

Auto Insurance Coverages Explained, Geico, http://www.qeico.com/qetaquote/auto/coverages-explained/, (Aug. 26, 2008), 2 pgs.

Automobile Insurance: Pay-at-the-Pump, Senate Committee on Insurance, Claims, and Corporations Art Torres, Chairman, (Apr. 21, 1993), 6 pgs.

Ben, Van Der Meer, "Driving less will cut insurance premiums: Your rate No. longer figured by ZIP code", Knight Ridder Tribune Business News, (Jul. 19, 2006), 2 pgs.

Cusano et al., "Driverless Cars will change Auto Insurance. Here's How Insurers can adapt", Harvard Business Review, Business Models, Dec. 2017.

Friedman, David, "Paying at the Pump", 2002 Analysis of Vehicles and Gasoline Costs, Union of Concerned Scientists, (Aug. 2002), 69 pgs.

Fung, "If drivers slam on brakes, will insurance rates accelerate?", The Washington Post, A 14, Jan. 5, 2016.

Khakifirooz et al., "The key Factors to Promote the Pay-As-You-Drive Insurance in Taiwan", Journal of Insurance Issues, vol. 44, Issue 2 (Year: 2021).

Khazzoom, J. Daniel, "Pay-At-The-Pump (PATP) Auto Insurance: Criticisms and Proposed Modifications", Discussion Paper 99-14-REV, Resources for the Future, (May 2000), 54 pgs.

Laurie, Alex, "Telematics The New Auto Insurance", [Online]. Retried from Internet: <http://www.towerswatson.com/assets/pdf/4125/1101-Telematcs-FIN.pdf>, (Accessed Nov. 11, 2011), 6 pgs.

Litman, Todd, "Distance-Based Vehicle Insurance as a TOM Strategy", http://ww.is1andnet.comHitman/dbvi.pdf, (Jun. 8, 2011), 35 pgs.

Litman, Todd, "Pay-As-You-Drive Pricing and Insurance Regulatory Objectives", Journal of Insurance Regulation, 19 pgs.

Migoya, David, "Dollars & Sense Reports on consumer affairs Drive less, get cheaper premiums", Denver Post, (Jun. 22, 2008), 2 pgs.

(56) References Cited

OTHER PUBLICATIONS

Mills, Evan, "The insurance and risk management industries: new players in the delivery of energy-efficient and renewable energy products and services", Elsevier, Energy Policy 31, (2003), 1257-1272.

Sugarman, Stephen D., ""Pay at the Pump" Auto Insurance", The California Vehicle Injury Plan (VIP), Institute of Governmental Studies, University of California, Berkeley, 75 pgs.

Xia et al., "Is Last-Mile delivery a Killer App for self-driving vehicles", Communications of the ACM, vol. 61, No. 11. Nov. 2018.

* cited by examiner

ESTIMATES FOR INSURANCE PREMIUM

| ROUTES | INSURANCE PREMIUM |
|---|---|
| ⊞ ROUTE A (11.9 MI) | $ 0.38 |
| ⊞ ROUTE B (12.2 MI) | $ 0.42 |
| ⊟ ROUTE C (11.6 MI) | $ 0.47 |

ORIGIN: 123 MAIN ST, BIG CITY, USA
1. HEAD SOUTH ON 8TH ST S TOWARD 2ND AVE S   0.2 MI
2. SLIGHT LEFT AT 10TH ST   1.1 MI
3. TAKE RAMP TO HWY 933 W   5.4 MI
4. TAKE TREE LAKE BLVD W EXIT   3.9 MI
5. TURN LEFT ON BLAKE RD   0.7 MI
6. TURN RIGHT ON HARVARD LN   0.3 MI

DESTINATION: 456 HARVARD LN, BIG CITY, USA

*FIG. 3*

SYSTEMS AND METHODS FOR DYNAMIC INSURANCE PREMIUMS

CROSS-REFERENCE TO RELATED APPLICATION

This patent application claims the benefit of priority, under 35 U.S.C. Section § 119(e), and is a continuation application of U.S. patent application Ser. No. 16/812,789, filed Mar. 9, 2020, which claims the benefit of priority, under 35 U.S.C. Section § 119(e), and is a continuation application of U.S. patent application Ser. No. 13/768,692 (now U.S. Pat. No. 10,657,597), filed Feb. 15, 2013, which claims the benefit of priority, under 35 U.S.C. § 119(e) to U.S. Provisional Patent Application Ser. No. 61/600,225, titled "Systems and Methods for Dynamic Insurance Premiums," filed on Feb. 17, 2012. All of these are incorporated by reference in their entirety.

This patent application is also related to U.S. Provisional Patent Application Ser. No. 61/600,259, titled "Systems and Methods for Adjusting Insurance Rates Based on Vehicle Telematics," filed on Feb. 17, 2012, which is incorporated by reference in its entirety.

TECHNICAL FIELD

The present disclosure relates generally to computer systems, and more particularly, to systems and methods to provide dynamic insurance premiums.

BACKGROUND

An insurance policy is a type of contract between an insurance company and an insured party to cover an asset. In the event of damage to or loss of the asset, the insurance company is obligated to cover the insured party when a claim is made on the asset. In exchange for insurance coverage, the insured party pays the insurance company an insurance premium. In the context of vehicle insurance, insurance premiums are typically calculated based on industry standard factors, such as vehicle type, driver history, and location of vehicle. In the context of life insurance, premiums are calculated based on the insured's age, lifestyle, occupation, and other factors affecting longevity.

Insurance premiums are generally set for broad statistical classes of people. In addition, insurance premiums are generally fixed for the length of a policy, from six months up to a year, or more, in some cases. The combination of these elements may result in premiums that do not match the risk, resulting in lost profits for an insurance company or overpayment by an insured party.

SUMMARY

In an embodiment, a system or method can monitor at least one of a first amount of time a vehicle operator is in active control of a vehicle during a period and a second amount of time that the vehicle operates autonomously during the period. The systems and methods further calculate an insurance rate based on the first amount of time and the second amount of time.

This summary is intended to discuss only some aspects of this disclosure and should not be interpreted as limiting any aspect of any claims in this or related applications.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 is a user-interface, according to an example embodiment;

DETAILED DESCRIPTION

Automobiles are becoming more sophisticated with each new model year. Features once thought to be science fiction are now becoming commonplace. For example, modem vehicles are being designed with safety systems to reduce collisions and mitigate those collisions that do occur. Collision avoidance systems include a wide range of technologies spanning from anti-lock brakes to headlight tracking systems to obstacle avoidance systems. Collision mitigation systems include things like interior and exterior airbag deployment systems, pre-tensioning seat belts, fuel line cutoff systems, and emergency response alert systems. Collision avoidance and collision mitigation systems are a subset of intelligent vehicle systems. Vehicle intelligence in this context means that a vehicle is able to detect a condition and respond to the condition.

In the coming years, driverless vehicles may become widely available. Driverless vehicles may also be referred to as autonomous vehicles or robotic vehicles. In general, a driverless vehicle is capable of sensing its environment and navigating without the aid of a human operator. Vehicles of this type may employ sensors to detect interior and exterior conditions. Sensors may include devices employed with laser, radar, lidar (Light Detection and Ranging), ladar (Laser Detection and Ranging), global positioning systems (GPS), or computer vision. Sensors may be integrated with navigation utilities to allow the driverless vehicle to navigate from an origin to a destination. In addition, a driverless vehicle may be equipped with a vehicular communication system. A vehicular communication system is a network of nodes (e.g., vehicles, roadside units, and central systems) that provide information to each other, such as traffic information, safety information, or weather conditions, for example. It has been stated that driverless vehicles may offer greater safety to both occupants and pedestrians.

Insurance companies, who are generally concerned with reducing liability for property damage and loss of life, have an interest in incentivizing policyholders to purchase or use automobiles with more intelligence.

System Level Overview

One mechanism for providing this incentive is by offering an insurance premium discount for owning or operating an intelligent vehicle, such as a driverless vehicle. Another mechanism is to provide discounts to drivers that choose a safer route over a less safe route. Another mechanism is to allow a driverless vehicle to control driving, especially in the case of high-risk operators who would otherwise be controlling the vehicle. Another mechanism is to provide an incremental premium program. Other mechanisms of adjusting an insurance premium based on the use of intelligent vehicle features are discussed below.

Figure 1:
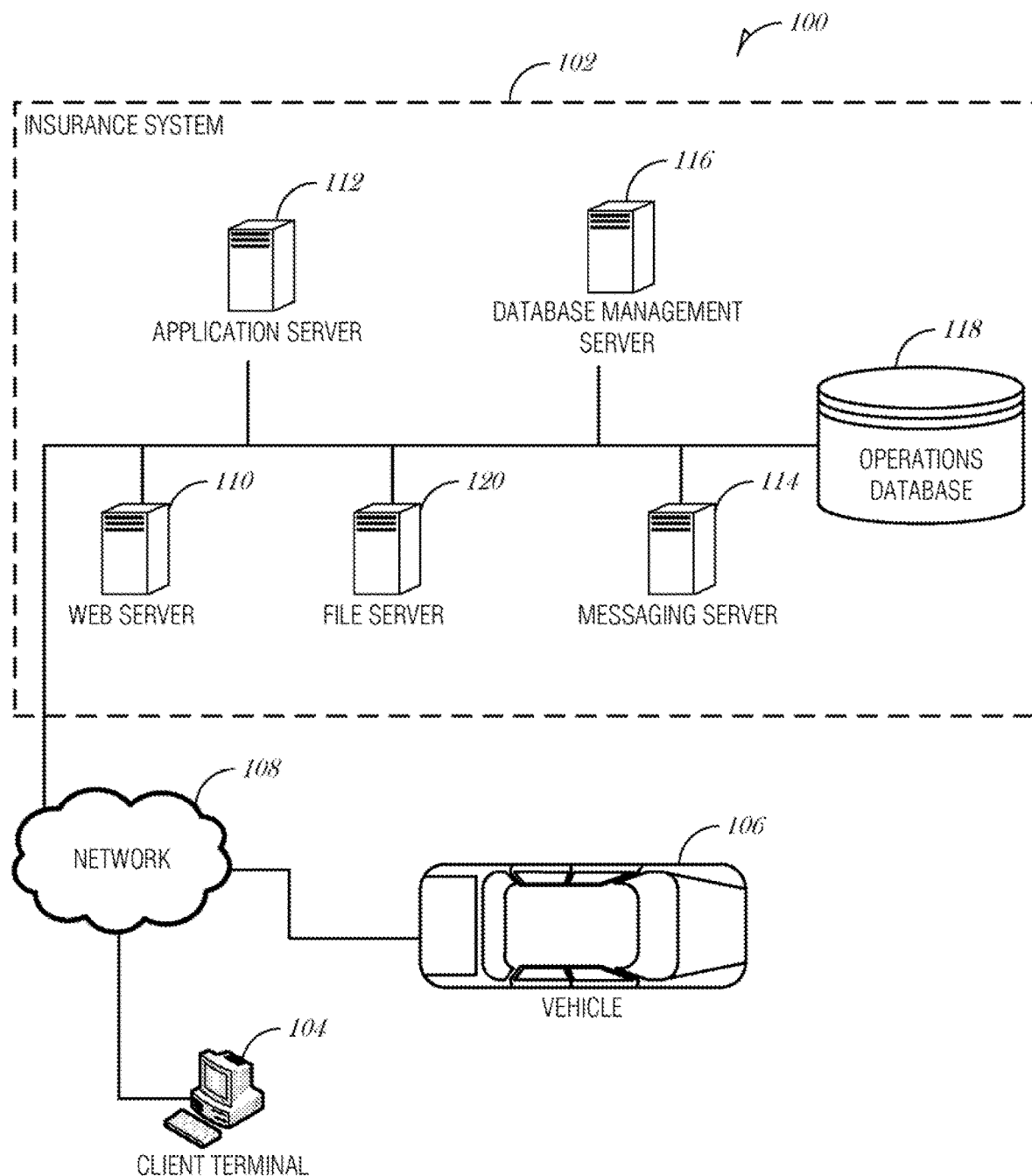
FIG. 1 is a schematic view of a computer network system, according to an example embodiment.

FIG. 1 is a schematic view of a computer network system 100, according to an example embodiment. The computer network system 100 includes an insurance system 102, a client terminal 104, and a vehicle 106, communicatively coupled via a network 108. In an embodiment, the insurance system 102 includes a web server 110, an application server 112, a messaging server 114, a database management server 116, which is used to manage at least an operations database 118, and a file server 120. The insurance system 102 may be implemented as a distributed system; for example, one or more elements of the insurance system 102 may be located across a wide-area network from other elements of the insurance system 102. As another example, a server (e.g., web server 110, file server 120, or database management server 116) may represent a group of two or more servers, cooperating with each other, provided by way of a pooled, distributed, or redundant computing model.

The network 108 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 108 may include a single local area network (LAN) or wide-area network (WAN), or combinations of LAN's or WAN's, such as the Internet. The various devices coupled to the network 108 may be coupled to the network 108 via one or more wired or wireless connections.

The web server 110 may communicate with the file server 120 to publish or serve files stored on the file server 120. The web server 110 may also communicate or interface with the application server 112 to enable web-based presentation of information. For example, the application server 112 may consist of scripts, applications, or library files that provide primary or auxiliary functionality to the web server 110 (e.g., multimedia, file transfer, or dynamic interface functions). In addition, the application server 112 may also provide some or the entire interface for the web server 110 to communicate with one or more of the other servers in the insurance system 102, e.g., the messaging server 114 or the database management server 116. The web server 110, either alone or in conjunction with one or more other computers in the insurance system 102, may provide a user-interface. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous Javascript and XML), Java™, JFC (Java™ Foundation Classes), and Swing (an Application Programming Interface for Java™).

In an embodiment, the client terminal 104 may include a client program to interface with the insurance system 102. The client program may include commercial software, custom software, open source software, freeware, shareware, or other types of software packages. In an embodiment, the client program includes a thin client designed to provide query and data manipulation tools for a user of the client terminal 104. The client program may interact with a server program hosted by, for example, the application server 112. Additionally, the client program may interface with the database management server 116.

The operations database 118 may be composed of one or more logical or physical databases. For example, the operations database 118 may be viewed as a system of databases that when viewed as a compilation, represent an "operations database." Sub-databases in such a configuration may include a product database, a customer database, a sales database, a marketing database, a business rules database, a reviews database, an insurance claims database, and the like. The operations database 118 may be implemented as a relational database, a centralized database, a distributed database, an object oriented database, or a flat database in various embodiments.

During operation, data from one or more data sources is imported into the operations database 118. Data sources may exist within an organization, such as a sales department or a subsidiary corporation, or exist at an external source, such as a business affiliate or a public record source. The data may be imported on a scheduled basis, such as weekly, monthly, quarterly, or some other regular or periodic interval. Alternatively, the data may be imported on-demand.

Imported data may include information from internal or external sources. External sources may include, but are not limited to, information from vehicle manufacturers, the Insurance Institute of Highway Safety (IIHS) or Highway Loss Data Institute (HLDI), or the Insurance Service Office, Inc., which provides statistics, rankings, ratings, or other metrics regarding automobile insurance.

Internal sources may include insurance claim information, vehicle pricing information (e.g., privately negotiated purchase price), and information from business partners. For example, the provider of the insurance system may partner with a vehicle purchasing business, where the vehicle purchasing business negotiates prices on behalf of users of the insurance system. In this way, a user may be provided a preferred price via the partnership with the vehicle purchasing business. Sale data or pricing data may be imported from the vehicle purchasing business.

Information imported or obtained may represent past or projected vehicle sales, vehicle characteristics (e.g., model, trim, and options), insurance information (e.g., local, state, or national average insurance coverage and costs), professional reviews, owner reviews, road test data, and the like. Additionally, information related to insurance products or customers may be imported or accessed. Insurance information includes, but is not limited to, information related to the insured party (e.g., demographic data, family information, beneficiary information), coverage history (e.g., type, length, amount, insured assets, and payment history), and claims history.

After data importation, the data may be standardized and then stored in a common database or data mart. For example, database records from business affiliates or other external (or even internal) sources may not be in a compatible format with the common database or data mart. Data conditioning may include data rearrangement, normalization, filtering (e.g., removing duplicates), sorting, binning, or other operations to transform the data into a common format (e.g., using similar date formats, name formats, address fields, etc.).

Once imported and standardized, the data may be considered to be in a "raw" form. That is, the data accurately represents the source data, albeit reformatted or rearranged for the sake of compatibility and consistency. In an embodiment, the "raw" data is stored for a relatively long period of time, such as six months or even several years. This persistent raw data storage may be useful for various purposes, such as data backup and restore, data auditing, or data modeling. In an embodiment, the persistent raw data is stored using a moving window of data. For example, an administrative user may define a window size of six months. When new data is saved in the persistent raw data, data older than the window size may be expunged from the persistent raw data storage. In an embodiment, multiple window sizes are used and each window size may be associated with a particular data. For example, insurance data may be stored using a window size of five years, while review data may be stored using a window size of two years. The retention period may be configurable by a user of the insurance system 102, or adjusted automatically by the insurance system 102.

In an example use of the insurance system 102, an insurance policy may be issued to a policyholder. The policyholder may manage the insurance policy through various means, such as by way of telephone or online. For example, the insurance company may offer the insurance system 102 so that the policyholder may access via the client terminal 104 to perform management functions with respect to the insurance policy. Adding or removing vehicles from the policy, adjusting coverage amounts, adding or removing drivers, changing a physical address, and other routine functions may be performed by the policyholder. In addition, the policyholder may provide information about a vehicle covered by the policy, including information regarding the existence, type, or configuration of intelligent features installed or in use by the vehicle. Alternatively, the policyholder may provide the insurance company access to the vehicle to evaluate or query the vehicle.

The user may access the insurance system 102 to check in during an operational period to view the aggregate insurance premiums for the operational period. For example, a user may check in to see the aggregate insurance premiums for the current month. The user may also use the client terminal 104 to access reports and other tools to view past usage, project future usage, or model different scenarios to provide insight into what may change the incremental insurance premiums. Further, the insurance system 102 may provide recommendations to the user on how to change behavior to reduce premiums. In some embodiments, the user may view other users, either individually or in the aggregate, to determine how their individual rate compares to the other's, and ascertain how to alter behavior in order to affect their rate. For example, if the user observes that a comparison group drives three miles per hour slower on average and this behavior reduces the effective premium by 10%, the user may be inclined or encouraged to alter his behavior in order to receive similar reductions in premium.

Figure 2:
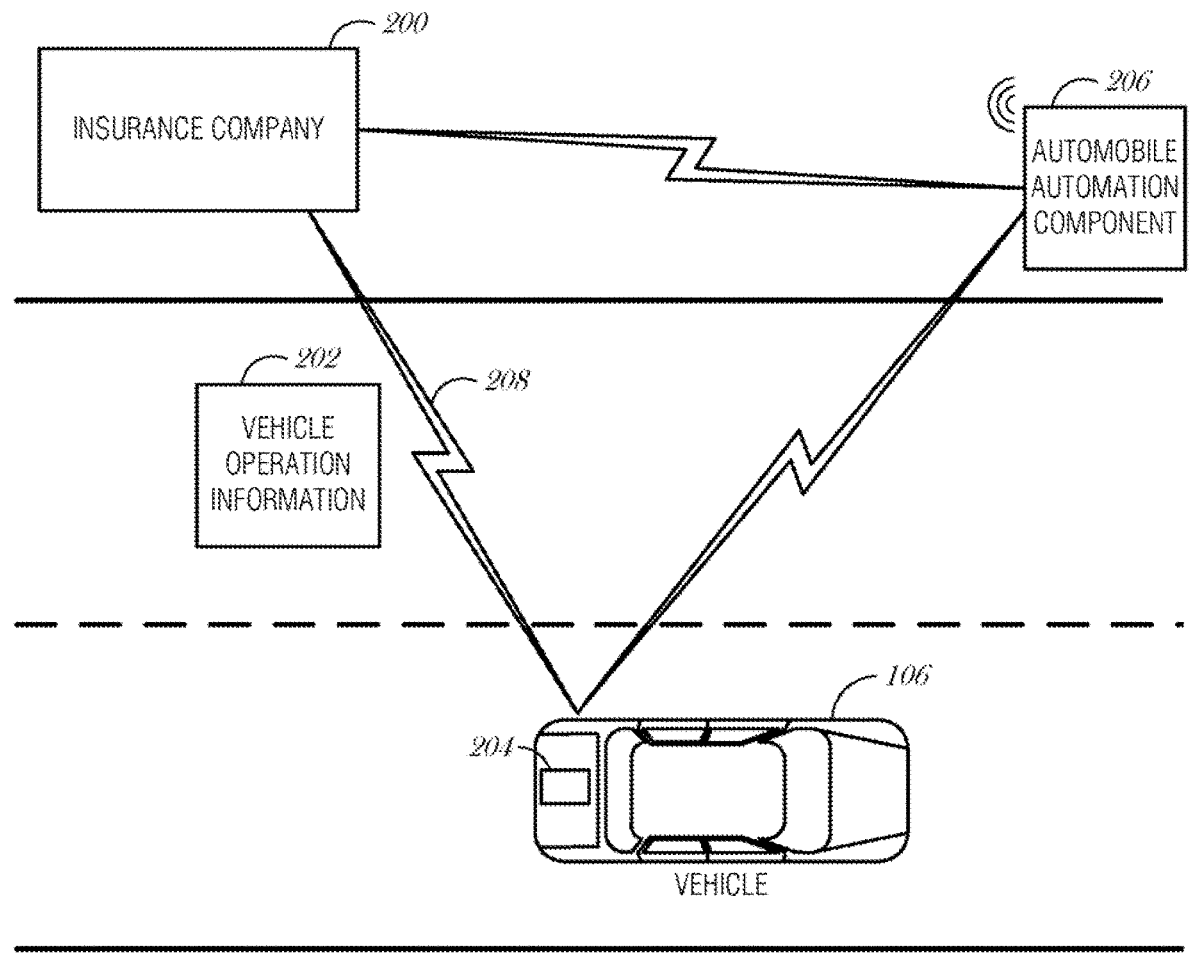
FIG. 2 is a diagram illustrating an example of components used by an insurance company to adjust an insurance premium, according to an example embodiment.

Several components are involved in various embodiments to enable an insurance company to adjust an insurance premium. FIG. 2 is a diagram illustrating an example of components used by an insurance company to adjust an insurance premium, according to an example embodiment. Components include the insurance company 200, vehicle operation information 202, onboard vehicle system 204, and automobile automation component 206.

The insurance company 200 may be in communication with the vehicle 106 via a wireless link 208. In some embodiments, the insurance company 200 monitors and collects information from the vehicle about the vehicle's operation, its passengers, the vehicle's environment, or other data available to the vehicle 106. The wireless link 208 may be established using various communication protocols, including but not limited to IEEE 802.11 protocols, WiMAX (IEEE 802.16d/16e), Global System for Mobile Communications (GSM), Personal Communications Service (PCS), cellular communication, and satellite communications.

Communication between the insurance company 200 and the vehicle 106 may be bidirectional. In an embodiment, the insurance company 200 communicates a query to the vehicle 106. In an embodiment, the query is used to determine an operational state, a driver, or an environmental condition of the vehicle 106. For example, the insurance company 200 may query the vehicle 106 to determine the current driver of the vehicle 106. As another example, the insurance company 200 may query the vehicle 106 to determine the vehicle's current speed, heading, location, or other vehicle telemetry data. The onboard vehicle system 204 may gather and maintain such data during the operation of the vehicle 106.

The vehicle 106 may automatically reply to an insurance company's query. In another example, a person may reply to the insurance company's query. For example, a query communicated to the vehicle 106 may be presented for a user, such as on a touchscreen dashboard display. The user may respond to the query by activating the touchscreen display. FIG. 3 is an example of a user interface, discussed further below.

The insurance company 200 may use the information obtained in various ways. In one example embodiment, the insurance company 200 may adjust an insurance premium for an insurance policy insuring the vehicle 106 based on the information obtained. In another example, the insurance company 200 may determine a travel route and communicate the route to the vehicle 106 or people in the vehicle 106. Other information may be communicated to the vehicle 106 or people in the vehicle 106.

In the example illustrated, the vehicle 106 may include one or more intelligent systems implemented, managed, or maintained by the onboard vehicle system 204. Intelligent systems include but are not limited to: (1) a road-minder system that prevents a driver from inadvertently steering a vehicle off of the road; (2) a safe-following-distance system that prohibits the driver from closing to less than a threshold distance from the vehicle it is following; (3) an automatic braking system that slows or stops the vehicle in an effort to avoid or minimize damage in an anticipated or imminent collision; (4) a lane-change system that corrects and maintains a vehicle's orientation in a driving lane; (5) an automatic control system that is able to take over for a driver and operate the vehicle after the vehicle has been started and driven to a particular location; and (6) an origin-to-destination system where a vehicle is automatically navigated and driven from a starting location to an ending location without driver input. Other systems, such as obstacle avoidance systems, speed control systems, geo-fencing coupled with vehicle disable systems, and the like may be used to control the time, place, and manner of driver performance or vehicle activity. In addition, the vehicle 106 may be equipped with health monitoring devices to monitor occupants.

Thus, to implement, manage, or maintain intelligent systems, the onboard vehicle system 204 may include apparatus such as sensor systems, control systems, and interface systems. Sensor systems may include devices such as laser rangefinders, radar, global positioning system (GPS), cameras (including infrared), gyroscopes, and radio frequency identification transceivers. Such sensor systems may be used to determine the vehicle's attitude, position, heading, velocity, location, acceleration, operation history, and the like. Sensor systems may also be used to sense objects around the vehicle 106, such as other vehicles, pedestrians, bicyclists, buildings, traffic signs, traffic lights, intersections, bridges, and the like.

The control systems are the brains of the onboard vehicle system 204. Control systems use the data gathered by the sensor systems to control the vehicle, or a subsystem of the vehicle, in an appropriate manner. Control systems may implement a neural network to learn behavior patterns of a driver and configure intelligent systems based on the behavior patterns. Control systems may also implement business rules, or other conditional behavior, which may be provided by the insurance company 200.

The interface systems may be used to interface with the driver or other occupant of the vehicle 106. To achieve this interface, the interface systems may include input and output devices including but not limited to keyboards, touchscreens, microphones, scroll wheels, displays, speakers, and haptic systems.

Vehicle operation information 202 may be communicated periodically or regularly from the vehicle. As an example, the vehicle operation information 202 may be transmitted at or near real-time to the insurance company 200. As another example, the vehicle operation information 202 may be transmitted monthly to the insurance company 200. As another example, the vehicle operation information 202 may be transmitted upon issuance or renewal of an insurance policy for the vehicle 106. Other time intervals are considered within the scope of this disclosure.

The onboard vehicle system 204 may include a transceiver to send and receive information from systems internal and external to the vehicle. The vehicle communication system may be a manufacturer-installed system or an aftermarket system. In addition, use of the vehicle communication system may be encouraged or required by the insurance provider. For example, in the case where the policyholder owns the vehicle, the insurance provider may incent the policyholder to install and use the vehicle communication system by offering a premium reduction or discount. In the case where the policyholder does not own the vehicle, e.g., renting, leasing, or paying off an existing loan, the policyholder may be required by the lien holder to use an onboard vehicle system 204.

The onboard vehicle system 204 may be configured to continually, or periodically, transmit information to an external destination, such as an insurance company 200. Alternatively, the onboard vehicle system 204 may only activate on certain conditions, such as after sensing an accident. The onboard vehicle system 204 may be integrated with a vehicle tracking system to track location of the vehicle, a vehicle monitoring system to track use and condition of the vehicle, or other vehicle-related systems installed on the vehicle.

Listed and explained below are alternative embodiments of onboard sensors, which may be connected to the onboard vehicle system 204 and utilized to collect and process data.

Examples of Drivetrain Sensors:
a. Camshaft Position Sensor
b. Coolant Temp
c. Crankshaft Position Sensor
d. Engine Knock
e. Fuel Evaporative
f. Fuel Temp
g. Intake Air Temp
h. Manifold Absolute Pressure (MAP)

Examples of Vehicle Control Sensors:
a. Brake Pressure & Temp
b. Remote Acceleration
c. Vibration Sensor
d. Wheel Speed
e. Wheel Slippage
f. Pump Motor Speed
g. Suspension Position
h. Transmission Speed Examples of Safety & Security Sensors:
a. Antilock Brakes
b. Adaptive Cruise Control
c. Child Detection
d. Driver ID
e. Impact Sensors (Accelerometer)
f. Seat Belt Pre-tensioners
g. Theft Protection
h. Door/Hood Position Switch
i. Glass Breakage Sensor Examples of Passenger Comfort Sensors:
a. Coolant Level
b. HVAC Temp
c. Humidity
d. Parking Brake Position
e. Washer Fluid Level Examples of Emission Control Sensors:
a. Catalytic Converter Temp
b. EGR
c. Mass Airflow Sensor
d. Oxygen Sensor Examples of Crash Avoidance Sensors:
a. Collision Warning Detection
b. Driver Drowsiness Sensor
c. Lane Departure Sensor
d. Lane Radar
e. Occupant Weight Sensor Examples of Passenger Convenience Sensors:
a. Remote Keyless Entry
b. Rain Sensor
c. Global Position Satellite Monitor
d. Window Fog
e. Dashboard Lighting Examples of Vehicle Maintenance Sensors:
a. Coolant Level
b. Fluid Level Sensors (Brake, Oil, Transmission, Power Steering, etc.)
c. Suspension Position
d. Tire Pressure Monitor Examples of Hybrid & Fuel Cell Variables Sensors:
a. Hydrogen Leak Detector
b. Magnetic Electric System
c. Pressure Sensor
d. Flow Sensor
e. Temperature Sensor Additional Sensors:
a. Impact Location on Car and Severity
b. Driver vitals and statistics c. Surrounding Vehicles based on wireless (or other) signal and signature of vehicle
d. Object Recognition and alert NHTSA Black Box Standards (Current Standard):
a. Vehicle longitudinal acceleration
b. Delta V
c. Indicated (Speedometer) travel speed
d. Engine RPM
e. Engine Throttle Position %
f. Service Brake Status
g. Ignition Cycle
h. Safety Belt Status
i. Status of Vehicle Air Bag
j. Throttle Positions
k. Elapsed time to all bag(s)
l. Capture 3 events in multi-car crash
m. DATA Possible from ECM Sensors:
n. Trip Mileage (Mileage from key-on to key-off)
o. Work/Hour (Timestamp from key-on to key-off)
p. Date/Time (Timestamp from key-on to key-off)
q. Trip Speed
r. Top Trip Speed
s. #High RPM
t. #High Break Pressures
u. ABS engagement
v. Angular velocity
w. Axle yaw rate
x. Average Mileage (Trip, Daily, Monthly, and etc)
y. Average Driving Conditions (Days, Times, Heavy Traffic, Stop & Go)
z. Days/Times (Day/Time Regression Analysis)
aa. Traffic Conditions (Heavy Traffic=high Work/Hour to Trip Mileage ratio)
bb. Driver Drowsiness (Blink Rate Sensor or Lane Departure Sensor)
cc. G-force
dd. Point of Impact (Vehicle Accelerometers, Nano technology paint)
ee. Racing (Frequent High RPM, Gas Mileage, and Vehicle accels, decels, and skid factors.)
ff. Tangential velocity
gg. Speed at Impact The policyholder or other users of the onboard vehicle system 204 may be provided an interface to configure the onboard vehicle system 204. For example, the onboard vehicle system 204 may interface with a navigation system in the vehicle and allow a person to configure aspects of the onboard vehicle system 204 operation via the navigation systems interface. Vehicles may have a vehicle control system to control climate settings, entertainment systems, or other features installed in a vehicle. The onboard vehicle system 204 may interface with such a vehicle control system.

As another example, an internet-based interface may be provided to the policyholder or other user. The internet-based interface may be accessed via a mobile device (e.g., cellular phone or smart phone), a general-purpose computer, a kiosk, or other access device.

Using an onboard interface or a network-based interface, the policyholder or other user may configure various aspects of the onboard vehicle system 204 operation, such as how data is sensed, collected, transmitted, received, or used.

FIG. 3 is a user-interface 300, according to an example embodiment. In the example shown, a user is provided with potential insurance premium rates. The user-interface 300 may be provided upon detecting that the vehicle is occupied. Various technologies may be used to detect the driver's presence, including but not limited to an interior motion detection system, a power door lock system, a weight scale incorporated into the driver's seat, an intelligent key fob, voice recognition, image recognition, and the like. The user-interface 300 may be provided via an interface system of the onboard vehicle system 204. For example, the vehicle may be equipped with a dashboard display, a heads-up display (HUD), or other auxiliary display. In other examples, the driver is queried by way of a personal communication device, such as a personal digital assistant (PDA), cellular phone, smart phone, portable computer, or other communication device.

The insurance company 200 is able to collect data from the vehicle 106 and the automobile automation component 206 to adjust insurance premiums or policy features and remotely monitor traffic, weather, and vehicle operation.

In some embodiments, sensor information is delivered to an insurance premium calculator. The insurance premium calculator may be hosted by an insurance company 200. Alternatively, the insurance premium calculator may be installed at the vehicle 106. Thus, as may be appreciated through the discussion of FIGS. 2 and 3, the insurance premium calculator is configured to receive data, such as vehicle operation data, vehicle occupant data, and environmental data. This data is used by the insurance premium calculator to derive a premium for insurance coverage. The following paragraphs include various examples of using sensor data when calculating insurance premiums.

Referring again to FIG. 2, the automobile automation component 206 includes devices, apparatus, machines, computers, or other items used by the onboard vehicle system 204 to provide intelligent vehicle features. While some onboard intelligent vehicle systems use existing road markings, street signs, mile markers, and other traditional objects, more advanced intelligent vehicle systems may use specific transceivers, transponders, or electronic signals, to operate. For example, highway automation systems may have "machine-readable" signs, marks, or other indicia to provide road boundaries, speed limits, restricted zones, or other traffic guidance to the onboard system.

In some example embodiments, the insurance company 200 communicates with the automobile automation component 206. For example, the automobile automation component 206 may gather information about traffic congestion. After obtaining the information of traffic congestion, the insurance company 200 may suggest a different route, inform the driver of a potential insurance rate change, or provide other advice or information to occupants in the vehicle 106 over communication link 208. Similarly, automobile automation component 206 may gather, sense, or provide information of other traffic-related data, such as accidents, weather, road conditions, construction, and special events (e.g., parades, politician visit, marathons).

Examples of Using Sensor Data

Some vehicles include a collision avoidance system or other system able to detect the proximity of other nearby vehicles. Thus, in an embodiment, data indicating how closely a driver is following another vehicle is used to affect the insurance rate. For example, the amount of time a driver follows other vehicles too closely may be converted to a percentage. If the percentage exceeds a threshold, the insurance premium may be adjusted. For example, if a driver follows other vehicles too closely more than 50% of the time, the driver's insurance premium may be increased by some value or percent. The term "too close" may be configurable by the insurance company. In some cases, the two-second rule may provide a good baseline for determining what distance is "too close" for following. The two-second rule refers to a following distance where the vehicle following takes at least two seconds to reach the same position as the lead vehicle. The distance is a linear function of velocity. If an insurance company desires its insured drivers to practice a higher level of safe driving, the threshold may be increased, such as distance based on a three-second rule. The driver may eventually lower the premium if they drive without following too closely for a threshold period, such as thirty days.

Vehicles may be equipped with GPS and navigational systems. With such systems, an insurance company may be able to determine how often a driver exceeds a posted speed limit. Similar to the example in the preceding paragraph, the amount of time driving at an excess speed may be calculated and compared to the overall driving time. Then, based on the actual time driving at an excess speed, a percentage of driving at an excess speed, or a number of times the driver is identified as driving at an excess speed, the insurance premium calculator may derive an insurance premium that is higher than a previous premium. The driver may eventually lower the premium if they drive without exceeding the posted speed limit for a threshold period, such as thirty days.

In some cases, when several vehicles are relatively close to each other on the road, the insurance premium calculator may access data of the other vehicles and determine how the other vehicles are operating. In doing so, the insurance premium calculator may be able to determine whether the driver's behavior is aberrant in comparison to other drivers. For example, during a rainstorm, the insurance premium calculator may determine that other drivers are driving at 10 miles per hour slower than the monitored driver is driving. As a result, the monitored driver may have their insurance premium increased as a reflection of the inferred unsafe driving activity.

In the context of a driverless vehicle, other situations may be used to adjust an insurance premium. In an embodiment, whether there are any occupants is a determining factor for an insurance premium. When there is an occupant, in an embodiment, the amount of time the occupant actively drives the vehicle may be used to determine or adjust the insurance premium. Further, in an embodiment, the identity of the occupant who is actively driving the vehicle is used as a factor in the insurance premium calculation. In contrast, when there are no occupants, insurance premiums and coverages may be adjusted to reflect the reduced risk. For example, when the vehicle is empty, certain medical payments or person injury coverages may be suspended and the associated premium may be removed during the portion of the vehicle's operation without occupants.

Because a driverless vehicle may not be actively driven by a person for at least some of the distance driven in a given period (e.g., year), the insurance company may use two metrics when determining an insurance premium for a driverless vehicle: the distance actively driven in a period, and the distance operated in the period. For example, an insured that has a driverless vehicle that is operated for 12,000 miles per year, but only actively drives the vehicle for 200 miles per year will likely pay less in insurance premiums than an insured that operates their vehicle for 12,000 miles per year and actively drives it for 4,000 miles. This is assuming that other characteristics of the drivers are approximately the same, such as age and location. The difference in premiums reflects the difference in risks. A person who actively drives the vehicle more in a given period is assumed to have a higher risk of human error, which may result in an insurable loss.

In addition, when an occupant in a driverless vehicle takes control of the vehicle, the insurance premium calculator may identify the driver's identity and evaluate the skills of the driver to affect the insurance premium rate. For example, a teenaged occupant may enjoy a lower effective insurance premium while not actively driving the vehicle, but once the teenager takes over control, the insurance premium may be increased to adjust for the increased risk. When an adult operator takes over operation of the vehicle, the insurance rate may also increase, but likely to a lesser amount than that of a teen driver.

In intelligent vehicles, including driverless vehicles, some features may differ from vehicle model to vehicle model. Thus, in an embodiment, the specific features of the intelligent vehicle may be used to adjust the insurance premium. For example, one manufacturer may offer a vehicle with a laser-based distance control system, and another manufacturer may offer a vehicle with a camera-based distance control system. Based on field tests or actual loss data, the insurance premium for one vehicle may differ from another vehicle reflecting the effectiveness of the corresponding distance control systems.

Examples of Using Data Related to Repair and Maintenance

Use of maintenance and repair history may be used by the insurance premium calculator to adjust rate. In an embodiment, maintenance and repair history is maintained at an onboard system in an intelligent vehicle. Intelligent vehicles are capable of performing some self-diagnostics. When a repair or maintenance activity is performed on the vehicle, the vehicle may be able to log the repair or maintenance activity and report it to the insurance premium calculator. By having the vehicle monitor and report repair and maintenance activity, the insurance company is assured that the information is not altered. In addition, the insurance company is assured that the information is delivered timely and secured.

Because an intelligent vehicle is able to monitor its own systems, the intelligent vehicle may report impending or existing events. Events may be vehicle-related events, such as low tire pressure, a periodic maintenance interval, or low gas. Events may also be environmental events, such as rain or hail. Based on the type of event, the insurance company may direct the vehicle to perform an automated action. For example, when the vehicle reports low tire pressure, the insurance company may, after receiving permission from the owner, direct the vehicle to drive itself to a repair shop to have its tires inflated. As another example, after receiving information that a hailstorm is approaching a vehicle's location, the insurance company may direct the vehicle to a location that is covered or otherwise protected until the storm passes. Such automated actions may reduce the losses and exposures to the insurance company.

Examples of Using Biometric Data

Some intelligent vehicles may have biometric monitors integrated into their sensor array. A vehicle with these types of systems may call for help when an occupant is determined to be having a medical problem. For example, an occupant's heart rate may be monitored by an onboard biometric monitor. When the heart monitor determines a potential health event, the health monitor may query the occupants for confirmation, contact emergency response services, contact family or other emergency contacts, contact an insurance company, log such events, or advise occupants of medical treatment.

Additionally, when a medical emergency occurs, a driverless vehicle may take control of the vehicle to safely guide it to the shoulder (emergency lane) and activate hazard flashers, for example.

The vehicle may report the condition of the vehicle and the occupants to a central dispatch system, which in turn dispatches response services. The response services, such as ambulances, police, or towing, may be prioritized based on the condition of the vehicle or occupants. Using onboard systems to automatically report occupant information may reduce the response time. It is also useful when the occupants are incapacitated or otherwise unable to call for help on their own (e.g., infants, children, or people who are mentally deficient).

Methods of Operation

In this section, particular methods to calculate insurance premiums and example embodiments are described by reference to a series of flow charts. The methods to be performed may constitute computer programs made up of computer-executable instructions.

Figure 4:
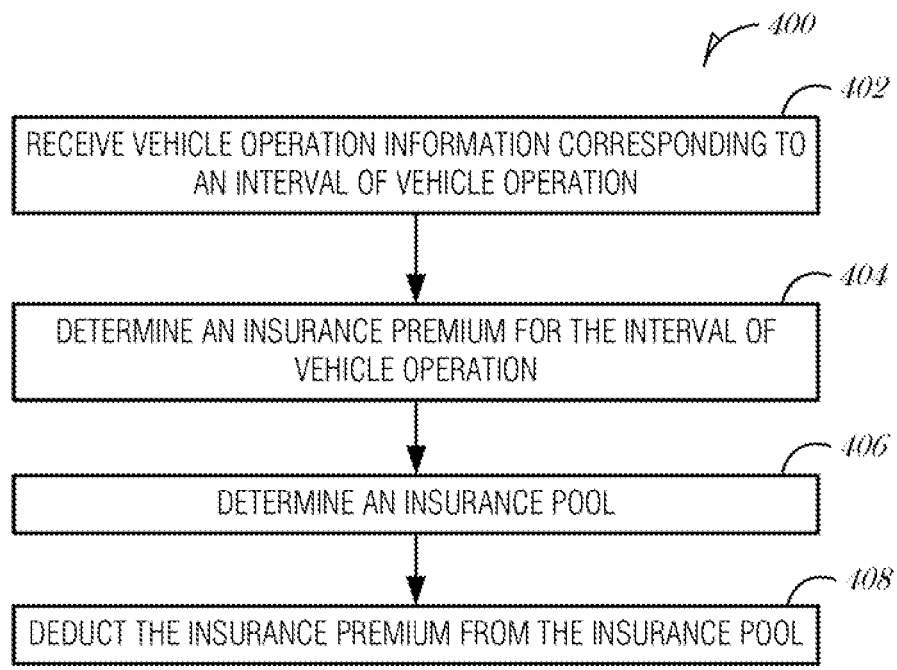
FIG. 4 is a block diagram illustrating a method of computing an insurance premium, according to an example embodiment.

FIG. 4 is a block diagram illustrating a method 400 of computing an insurance premium, according to an example embodiment. At block 402, vehicle operation information corresponding to an interval of vehicle operation is received. In an embodiment, the vehicle operation information is received at a computing system, for example, the insurance system 102 from FIG. 1.

At block 404, an insurance premium for the interval of vehicle operation is determined. In various embodiments, the vehicle operation information is vehicle telemetry data, vehicle operator data, or a combination of vehicle telemetry data and vehicle operator data. Vehicle telemetry data includes data that provides information of vehicle use, operation, or performance. Such data may include measurements of acceleration, deceleration, velocity, or GPS tracking. Thus, in various embodiments, the vehicle telemetry data comprises at least one of: a vehicle route, a vehicle location, a vehicle speed, a distance travelled, or a history of vehicle operation. Vehicle operator data includes information regarding the vehicle operator. Thus, in various embodiments, the vehicle operator data comprises at least one of: an identity of the vehicle operator, a license status of the vehicle operator, an age of the vehicle operator, or a number of occupants in the vehicle. In some embodiments, the number of occupants in the vehicle is taken into consideration when determining the insurance premium. For example, a vehicle with four occupants may expose the insurance provider to more liability, thus the premiums are adjusted to reflect the higher risk. Alternatively, when the vehicle is unoccupied, such as in a driverless vehicle context, the premiums may be lowered to reflect the reduced risk.

At block 406, an insurance premium pool is determined. An insurance premium pool is money or credits that may be used to pay for some or all of an insurance premium (e.g., car insurance premiums). In an embodiment, the insurance premium pool is funded by the policyholder and configured to be applied against premiums determined for consecutive intervals of vehicle operation. In embodiments, the interval of vehicle operation comprises at least one of: an interval of distance travelled or an interval of time. For example, distance-based intervals may be based on an expected average monthly use, such as 1000 miles per month. In this case, the interval is 1000 miles and premiums are calculated every 1000 miles and applied against the insurance premium pool. It is understood that any distance may be used to represent the interval. Thus, in various embodiments, the interval of distance comprises at least one of: a mile, a quarter mile, a kilometer, or another measurement of distance. For example, the premium may be calculated every quarter mile of vehicle operation, the premium then being deducted from the insurance premium pool.

Alternatively, intervals may be based on time, such as monthly. In this case, the premiums are calculated monthly and applied against the insurance premium pool. It is understood that any time-based interval may be used. Thus, in various embodiments, the interval of time comprises at least one of: a minute, an hour, or a day. For example, the premium may be calculated at every hour of vehicle operation.

At block 408, the insurance premium for the interval of vehicle operation is deducted from the insurance premium pool. In a further embodiment, it is determined whether the amount of funds in the insurance premium pool falls below a threshold value. If the funds do fall below the threshold value, the policyholder is notified. This mechanism allows the policyholder to fund the insurance premium pool before it is depleted, which would result in the policyholder having an uninsured or underinsured vehicle.

The threshold value is configurable by the policyholder, in an embodiment. A value is received from the policyholder to use as the threshold value and the threshold value is configured using the received value. The threshold may be represented in various ways. In an embodiment, the threshold value is an amount of currency. For example, the threshold value may be $50. In an embodiment, the user is notified if the insurance premium pool is depleted. In another embodiment, the threshold value is a percentage of the insurance premium pool. For example, the policyholder may define the threshold value as 3% of the original value of the insurance premium pool. Thus, if the policyholder funded the insurance premium pool with an initial amount of $500, the threshold value would be set at $15 (3% of $500).

Figure 5:
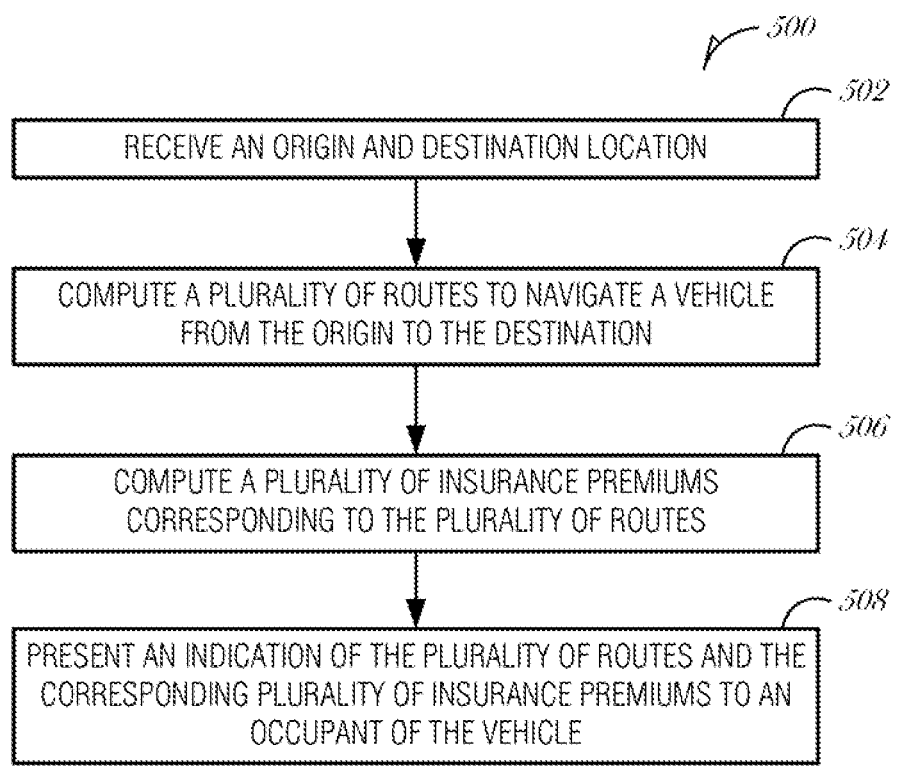
FIG. 5 is a block diagram illustrating a method of providing a dynamically calculated insurance premium, according to an example embodiment.

FIG. 5 is a block diagram illustrating a method 500 of providing a dynamically calculated insurance premium, according to an example embodiment. At block 502, an origin location and a destination location are received. In an embodiment, the locations are received at a computing system, such as the insurance system 102 in FIG. 1.

At block 504, a plurality of routes to navigate a vehicle from the origin location to the destination location is computed. The plurality of routes may be computed based on a history of routes taken by the vehicle between the origin and destination locations, or even between origin and destination locations near the specified origin and destination locations. Routes may be calculated based on one or more of optimizing fuel efficiency, travel time, distance traveled, or insurance cost, for example. The factors used to calculate, sort, and filter routes may be managed by user preferences.

At block 506, a plurality of insurance premiums corresponding respectively to each of the plurality of routes is computed. The insurance premiums may be based on the potential exposures along each route, calculated by analyzing the traffic patterns, accident history, crime rate, or other metrics that may impact insurance losses. For example, a route through a residential neighborhood along side streets will have a different insurance profile than a route that is primarily on an interstate highway. As another example, a route through an urban neighborhood may have a different insurance profile than a route that is primarily through a suburban neighborhood, based on income levels of residents, the percentage of insured residents, education levels of residents, or other factors that may affect the potential insurance exposures.

At block 508, an indication of the plurality of routes and the corresponding plurality of insurance premiums is presented to an occupant of the vehicle. One example of such a presentation is illustrated in FIG. 3, as discussed above. The plurality of routes may be presented in any conventional manner, including but not limited to dashboard displays, heads up displays, audible prompts, or combinations of these.

In a further embodiment, the method 500 includes identifying a maximum amount available for insurance premiums in a period and removing a route from the plurality of routes that include a corresponding insurance premium that causes an aggregate cost for insurance premiums in the period to exceed the maximum amount available for the period. The maximum amount available for insurance premiums may be limited by a monthly or daily allowance, for example. The policyholder, vehicle operator, or insurance provider may set the maximum amount available.

In a further embodiment, the method 500 includes receiving from an occupant of the vehicle, a selection of a route from the plurality of routes. For example, the driver may select a route from the displayed alternatives. An insurance premium pool configured to be applied against premiums is identified. In an embodiment, the insurance premium pool is a fund managed by the policyholder to pay premiums for one or more policies held by the policyholder. The insurance premium pool may be identified by first identifying the occupants of the vehicle, then identifying the policyholder based on the occupants. Alternatively, the vehicle may be identified, and an insurance policy pool associated with the insurance policy of the vehicle is then identified. After identifying the proper insurance premium pool, the insurance premium corresponding to the selected route from the insurance premium pool is deducted from the funds in the pool. In an embodiment, driverless navigation of the vehicle to navigate the vehicle to the selected route is initiated based on the selected route.

Figure 6:
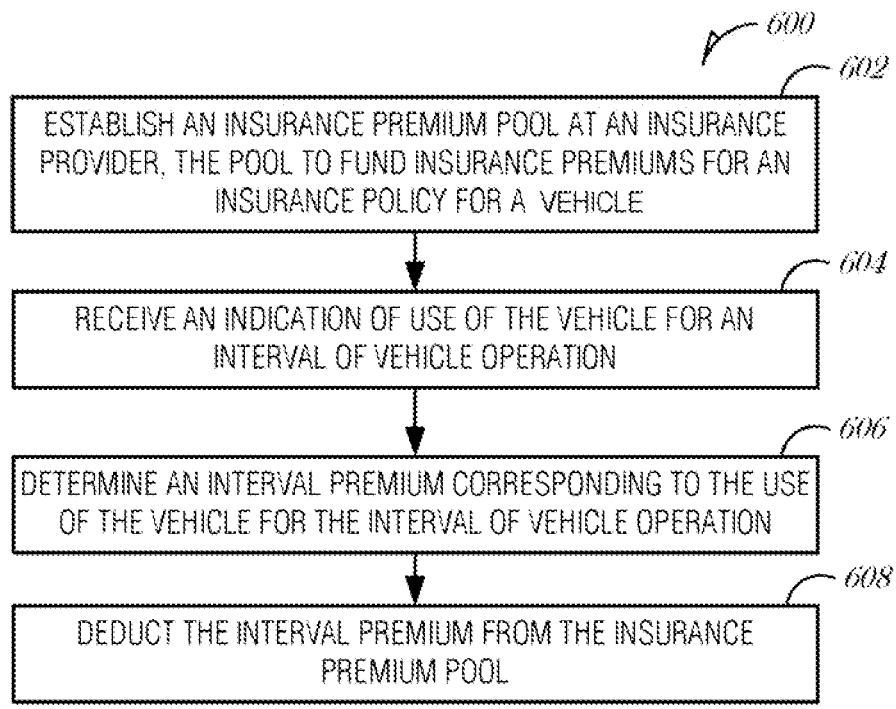
FIG. 6 is a block diagram illustrating a method of managing an insurance premium pool, according to an example embodiment.

FIG. 6 is a block diagram illustrating a method 600 of managing an insurance premium pool, according to an example embodiment. At block 602, the insurance premium pool is established at an insurance provider. In an embodiment, the insurance premium pool is associated with an insured party and includes funds to be applied to an insurance premium for an insurance policy provided by the insurance provider to the insured party, where the insurance policy is to cover a vehicle owned by the insured.

At block 604, an indication of use of the vehicle for an interval of vehicle operation is received. The indication of use may be represented by a number of miles driven, the number of minutes or hours operated, or other measurements of use. In an embodiment, the interval of vehicle operation comprises at least one of: a mile, a quarter mile, a kilometer, or another measurement of distance. In another embodiment, the interval of vehicle operation comprises at least one of: a portion of an hour, an hour, a day, or another measurement of time.

At block 606, an interval premium corresponding to the use of the vehicle for the interval of vehicle operation is determined. The interval premium is a premium based on the use of the vehicle during the interval. The interval premium may be relatively small in value, such as less than a dollar, when the interval of vehicle operation is short, such as a quarter mile. Over time, the interval premiums are periodically or regularly calculated based on actual operation of the vehicle.

At block 608, the interval premium is deducted from the insurance premium pool. In a further embodiment, the method 600 includes determining a remaining balance of the insurance premium pool after deducting the interval premium. Whether the remaining balance is less than a threshold value is then determined, and when the remaining balance is less than the threshold value, an alert is transmitted to the insured party.

Figure 7:
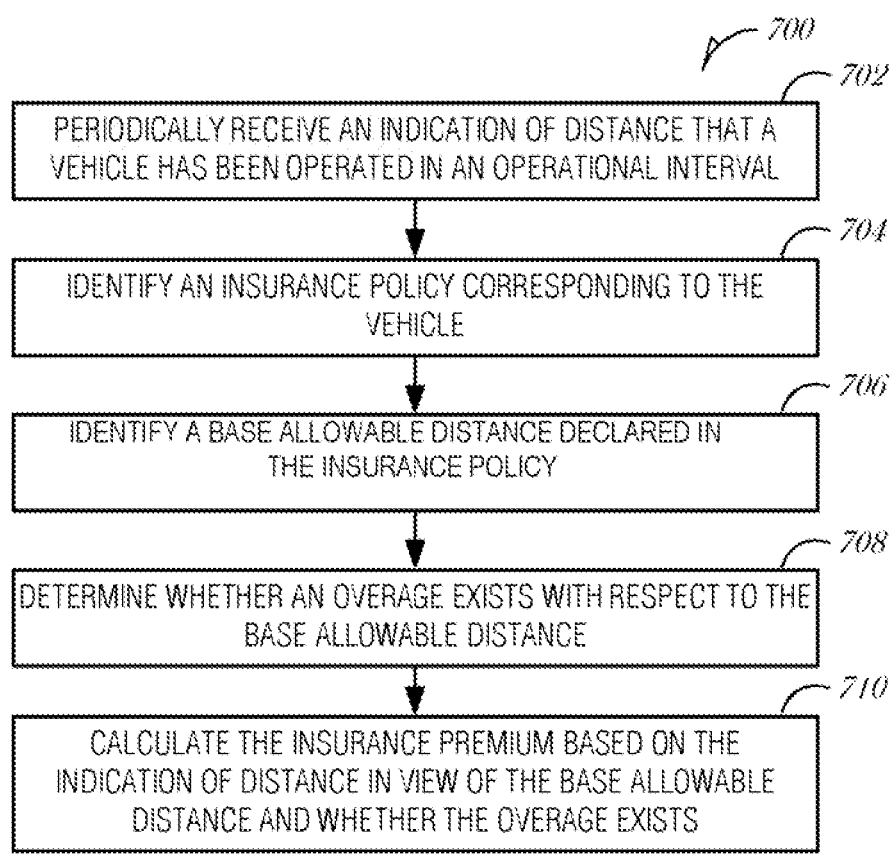
FIG. 7 is a block diagram illustrating a method of calculating an insurance premium, according to an example embodiment.

FIG. 7 is a block diagram illustrating a method 700 of calculating an insurance premium, according to an example embodiment. At block 702, an indication of distance that a vehicle has been operated in an operational interval is received periodically. In an embodiment, the indication is received at a computerized insurance system, such as the insurance system 102 in FIG. 1. In an embodiment, the periodic receipt of the indication of distance is performed on a monthly basis. In other embodiments, the receipt of the indication of distance is performed on a daily, hourly, or other portion or multiple of days, hours, or minutes. In an embodiment, the indication of distance that the vehicle has been operated indicates a number of miles operated.

At block 704, an insurance policy corresponding to the vehicle is identified. This may be performed by identifying the vehicle or person reporting the indication of distance, and then looking up the insurance policy in the operations database 118 (FIG. 1), for example.

At block 706, a base allowable distance declared in the insurance policy is identified. The base allowable distance is the operational distance allowed per operational interval for a base rate. The base allowable distance may be banded, such as where "Band 1" is from 0-500 miles per month, "Band 2" is from 500-1000 miles per month, and "Band 3" is from 1000-5000 miles per month. A policyholder may elect a band and pay a corresponding base price for band. This allows the policyholder use of the vehicle up to the maximum miles in the band for a single, base rate. Miles used over the band's limit may be billed on a per mile basis.

Thus, at block 708, whether an overage exists with respect to the base allowable distance based on the indication of distance is determined. For example, if the policyholder elected "Band 2" and then actually operated the vehicle for 525 miles in a given month, the policyholder is subject to the cost of 25 miles of overage.

At block 710, the insurance premium based on the indication of distance in view of the base allowable distance and whether the overage exists is calculated. In a further embodiment, calculating the insurance premium is done by calculating a per unit distance cost for each unit over the base allowable distance and aggregating the per unit distance cost with the base rate to calculate the insurance premium. The per unit distance cost is a cost per mile, in an embodiment. In other embodiments, the per unit distance cost is a cost per quarter mile, cost per kilometer, or cost per portions or multiples of miles, kilometers, or other measures of distance.

While bands are discussed in the context of distance-based bands, it is understood that time-based bands may also be used. For example, a policyholder may elect a band that allows for 50 hours of vehicle operation per month, after which the policyholder is billed on a per minute basis for continuing insurance coverage. Furthermore, combinations of distance-based and time-based bands may be used. For example, a first tier band may be for 500 miles or 40 hours of use, whichever comes first, with a per mile or per minute charge after the base is depleted.

The cost of the first tier band may differ from the cost of other bands, when compared on a per unit cost. The cost may be lower or higher for more miles per month based on whether the insurance company determines that additional usage may cause a higher or lower non-linear risk of exposure.

In other embodiments, the base allowable distance may be personalized to the policyholder. For example, the based distance may be specified or agreed upon by the policyholder and insurance provider and set to an arbitrary number of miles per month based on a policyholder's estimated use. Such an embodiment may exist in combination with bands so that the policyholder may elect a band or may instead, elect to set their own base allowable distance.

While discussion of insurance pools and incremental insurance have been in the context of vehicle insurance, it is understood that other types of insurance products may be implemented with such mechanisms. For example, in the context of life insurance, insurance premiums may be calculated month-by-month based on detected or recorded personal habits. A person who smokes more than ten cigarettes a day may be rated differently than one who smokes less than ten cigarettes per day. The number of cigarettes a person smokes in a particular day may be detected by a biometric sensor, a gas detector to detect sidestream or mainstream smoke, or other mechanisms. The number of cigarettes a person smokes may also be reported by the person, such as on a mobile phone application. Other types of behavior and habits related to general or specific health can be tracked, such as sleep patterns, eating habits, food contents, work habits, driving habits, exercise routines, and the like. The policyholder may be given a discount on life insurance premiums based on providing permission to monitor their health in this manner.

Figure 8:
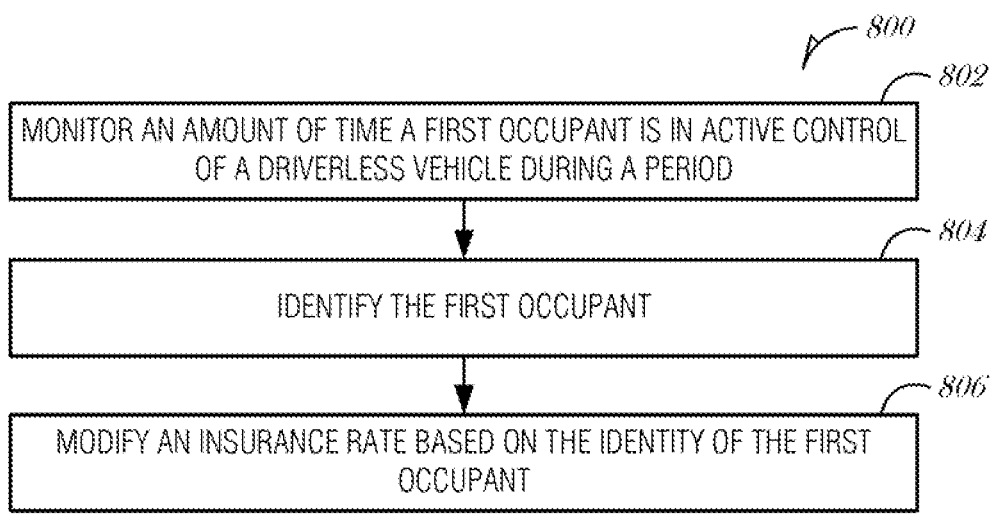
FIG. 8 is a block diagram illustrating a method of calculating an insurance premium for a driverless vehicle, according to an example embodiment.

FIG. 8 is a block diagram illustrating a method 800 of calculating an insurance premium for a driverless vehicle, according to an example embodiment. At 802, an amount of time is in active control of the driverless vehicle during a period is monitored. An occupant is considered to be in active control of a vehicle when the occupant is steering, braking, accelerating, or otherwise operating the vehicle using conventional controls. In addition, an occupant is considered to be in active control of a vehicle when the occupant overrides a driverless vehicle's operation (e.g., driverless mode). The period may be measured in minutes, hours, days, months, years, or other portions or multiples of such measurements. In an embodiment, the period is a 6-month period.

At 804, an insurance rate for a subsequent period is modified based on the amount of time the first occupant is in active control of the driverless vehicle. For example, when a policy is first underwritten, it may be assumed that a driver will actively drive a driverless vehicle for 10% of the time on average. Based on monitoring the first 6-month period of the policy, it may be determined that the occupant actively drove the vehicle 25% of the time. Using various insurance models, this may indicate an increased risk of accidents or other perils. Other models may indicate that active driving increases wear and tear, resulting in more frequent break downs, repairs, accidents due to malfunctioning components, or the like. Thus, because of the higher-than-average active driving observed, the insurance rate for the second 6-month period of the policy is increased by 20%.

The subsequent period does not need to be same length as the prior period. For example, a policyholder may opt to change a 6-month renewal policy to a 2-month renewal policy, or even a daily-renewal policy, where insurance rates are adaptively modified for the subsequent period based on active driving during the previous period.

In an embodiment, a first percentage of active driving time of the driverless vehicle is accessed. The first percentage may be a baseline percentage, a presumed percentage, or a previous period's percentage, in various embodiments. A baseline percentage may be established by an organization and may be used as a default value. The baseline percentage may be based on actual value or statistical values, or a combination. The presumed percentage may be a value that is used for a particular insured person. For example, the presumed percentage may be a value provided by the insured person at the time of the policy's origination. As another example, the presumed percentage may be a value for a type of driver, a class of driver, or some other demographic, social, socioeconomic, risk category, or other grouping of people. The previous period's percentage is an actual value of the driverless vehicle's active operation during a previous period. A second percentage of active drive time of the driverless vehicle, based on the amount of time the first occupant was in active control of the driverless vehicle during the period is calculated. The insurance rate for the subsequent period is then increased or decreased based on a corresponding increase or decrease of the second percentage in comparison to the first percentage. The increase or decrease may be based on various statistical models.

In some cases, who is actively driving may impact the premium. Thus, in a further embodiment, the method 800 includes identifying the first occupant and modifying the insurance rate based on the identity of the first occupant. The occupant may be identified using various mechanisms, such as voice recognition, RFID tags on a keychain, fingerprint recognition, and the like.

In a further embodiment, the method 800 includes monitoring a second occupant during the period. In such an embodiment, modifying the insurance rate for the subsequent period is performed by modifying the insurance rate based on the identities of the first and second occupants who were in active control during the period. For example, suppose that there are two drivers of a vehicle, an 18 year old son and his father, who is 52 years old. Further suppose that during a 6-month period, the son actively drove the vehicle for 50 hours, while the father actively drove for 5 hours. Because the son is generally a higher risk when actively driving than the father, the insurance rate for the 6-month period may be weighted to a higher value. If, instead, the father drove the vehicle for 50 hours and the son drove the vehicle for 5 hours, then the premium may be much less. Furthermore, if the son only drove the vehicle in and out of the driveway to park the vehicle, then the premium may be even lower for the next 6-month period. Various models may be used to determine the relative risk based on the active usage of two or more operators during a period.

Figure 9:
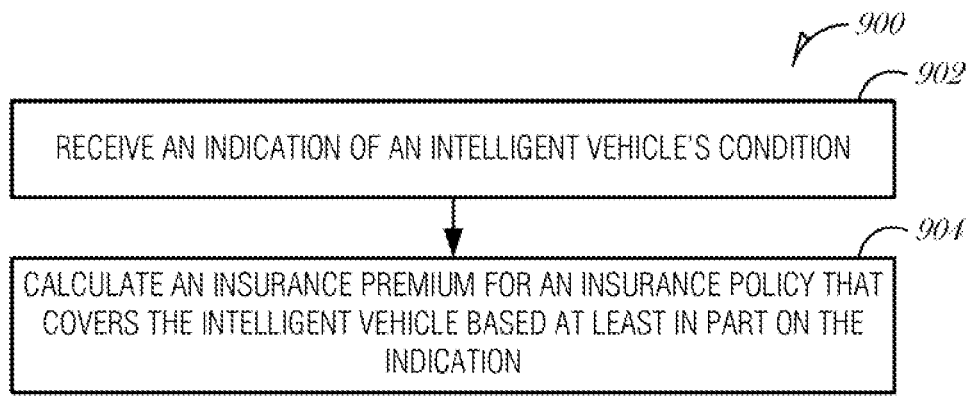
FIG. 9 is a block diagram illustrating a method of calculating an insurance premium for an intelligent vehicle, according to an example embodiment.

FIG. 9 is a block diagram illustrating a method 900 of calculating an insurance premium for an intelligent vehicle, according to an example embodiment. An intelligent vehicle may be distinguished from a driverless vehicle in that the intelligent vehicle provides information the occupants of the vehicle based on sensors in the vehicle. An intelligent vehicle may be equipped with systems that assist the driver, such as a pre-collision braking system, but is not necessarily capable of taking over driving duties. Driverless vehicles may be considered intelligent vehicles, but with the additional capability of driverless operation.

At block 902, an indication of the intelligent vehicle's condition is received from the intelligent vehicle. In an embodiment, the indication is received at a computerized insurance system, such as the insurance system 102 in FIG.

1. In an embodiment, the indication is received at regular intervals. The intervals may be relatively short, such as every 5 minutes, or relatively long, such as every month.

At block 904, the insurance premium for an insurance policy that covers the intelligent vehicle is calculated based at least in part on the indication of the intelligent vehicle's condition. The indication of the vehicle's condition may provide insight into existing problems or probable future problems. In a further embodiment, an existing insurance policy is adjusted based on the calculated insurance premium. The existing insurance policy may be the insurance policy that covers the intelligent vehicle. In another example, the existing insurance policy may be a life insurance policy for the policyholder of the insurance policy that covers the intelligent vehicle.

In an embodiment, the indication of the intelligent vehicle's condition indicates whether routine maintenance has been performed or is due. Routine maintenance includes activities such as rotating tires, oil changes, coolant changes, lubrication service, and the like. Routine maintenance increases reliability of vehicles and generally reduces the risk of a catastrophe due to malfunctions.

In an embodiment, the indication of the intelligent vehicle's condition indicates whether pending repairs has been performed or is due. Some pending repairs do not render the vehicle undrivable and are therefore delayed or ignored by the vehicle's owner. Such pending repairs though may affect the vehicle's performance or reliability and should be attended to as quickly as possible. An intelligent vehicle may be able to detect pending repairs and notify the insurance provider of such repairs. The insurance company may then use such information to adjust insurance rates for the vehicle based on a calculated increase to potential hazards. Some examples of pending repairs include a broken taillight, a cracked windshield, a missing side mirror, wheel misalignment, or worn brake pads. An intelligent vehicle may be equipped with sensors to detect these conditions and others. The intelligent vehicle may warn the occupant or insurance provider and may provide recommendations.

In an embodiment, the indication of the intelligent vehicle's condition indicates whether a safety issue exists. In some cases, safety issues include conditions that may also be considered pending repairs, such as a broken windshield. However, safety issues also include other conditions, such as using a summer performance tire when snow and ice are on the roads. While not necessarily a repair issue, use of summer performance tires during the winter is a potential safety issue. Other safety issues include occupants who are not using seat belts, too many occupants in a vehicle, towing a trailer that is over the rated weight capacity, driving without headlight illuminated after sunset, or driving with snow on the back window. Safety issues may be recognized by considering the state of the driver, the state of occupants, the state of the vehicle, or combinations of these states.

In an embodiment, the indication of the intelligent vehicle's condition is provided with a diagnostic trouble code. Diagnostic trouble codes are codes used in the automotive industry to identify vehicle conditions. There are generic codes that apply to many vehicles and manufacturer-specific codes used for conditions specific to a vehicle or a line of vehicles. Also, some foreign codes are available for foreign vehicles and they may not be the same as the generic codes. Codes are generated by an onboard diagnostics system that monitors nearly all engine controls and some other parts of the body (e.g., chassis, body, etc.). By analyzing codes, the occupant or insurance provider may be able to determine a specific pending repair or malfunction that needs attention.

Because some vehicle owners may not want this level of monitoring due to privacy concerns or the like, in some cases, the insurance provider may incentivize use of this type of monitoring. Thus, in a further embodiment, a discount of the insurance premium is provided in exchange for the policyholder agreeing to allow the computerized insurance system to receive information from the intelligent vehicle. The discount may be a dollar amount or a percentage discount, in various embodiments.

Further, because a safer vehicle correlates to a reduced likelihood of injury or death of its occupants, some insurance providers may offer adjustment to life insurance policies of the occupants of the vehicle. Thus, in an embodiment, a life insurance premium of a life insurance policy is calculated based at least in part on the indication of the intelligent vehicle's condition. In a further embodiment, the life insurance policy is adjusted based on the calculated life insurance premium.

Hardware and Operating Environment

This section provides an overview of example hardware and the operating environment in conjunction with which embodiments of the present disclosure may be implemented.

Figure 10:
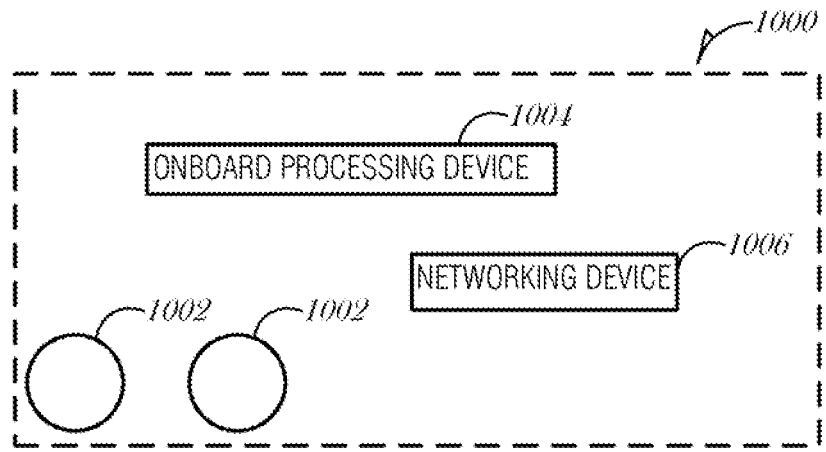
FIG. 10 is a block diagram illustrating a system to record and process vehicle data, according to an example embodiment.

FIG. 10 is a block diagram illustrating a system 1000 to record and process vehicle data, according to an example embodiment. The system 1000 represents one possible embodiment of an onboard vehicle system 204 (as described in FIG. 2). The system 1000 comprises a plurality of onboard sensors 1002 to capture data, an onboard processing device 1004, and a networking device 1006 to establish a remote connection capable of sending and receiving data to and from external sources. The networking device 1006 combined with the onboard processing device 1004 may contain the necessary hardware to connect using a wireless networking protocol. For example, the networking device 1006 may establish a network connection with a satellite or telecommunication network.

A plurality of onboard sensors 1002 may be connected to a vehicle to measure various aspects of vehicle operation. Examples of onboard sensors, which may be incorporated in the present disclosure include but are not limited to sensors for the drivetrain, engine, automotive body, vehicle control, passenger comfort, passenger convenience, emission control, electrical devices, vehicle maintenance, crash avoidance, hybrid and fuel cell management, among others.

An onboard processing device 1004 may be any device having a processor or microprocessor capable of processing data. In one embodiment, the onboard processing device 1004 may be a computer system embedded in a vehicle.

Figure 11:
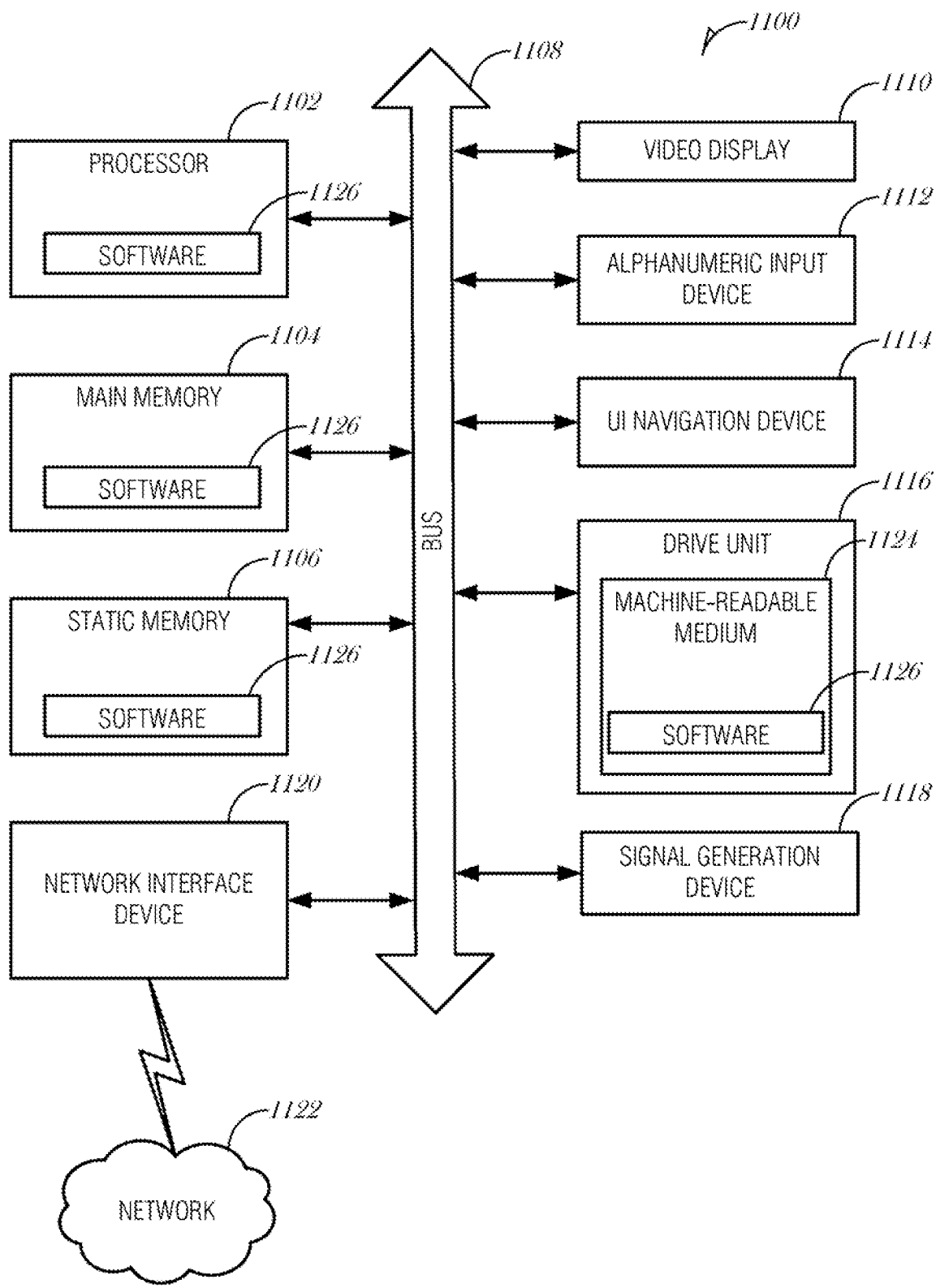
FIG. 11 is a block diagram illustrating a computer system, according to an example embodiment.

FIG. 11 is a block diagram illustrating a computer system 1100, within which a set or sequence of instructions for causing the machine to perform any one of the methodologies discussed herein may be executed, according to various embodiments. In various embodiments, the machine may comprise any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 includes a processor 1102 (e.g., a central processing unit (CPU)), a main memory 1104 and a static memory 1106, which communicate via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e. g., a mouse), a disk drive unit 1116, a signal generation device 1118 (e.g., a speaker) and a network interface device 1120 to interface the computer system to a network 1122.

The disk drive unit 1116 includes a machine-readable medium 1124 on which is stored a set of instructions or software 1126 embodying any one, or all, of the methodologies described herein. The software 1126 is also shown to reside, completely or at least partially, within the main memory 1104 and/or within the processor 1102. The software 1126 may further be transmitted or received via the network interface device 1120.

While the computer system 800 is shown with a processor 1102, it is understood that the systems and methods described herein may be implemented on one or more processors on one or more computer systems, including but not limited to a multi-processor computer (e.g., two or more separate processors or two or more cores in a single processor), a multi-computer system (e.g., a distributed computing environment), or a mixture of single-processor and multi-processor computers in a distributed fashion.

The embodiments described herein may be implemented in an operating environment comprising software installed on any programmable device, in hardware, or in a combination of software and hardware.

For the purposes of this specification, the terms "machine-readable medium" or "computer-readable medium" shall be taken to include any tangible non-transitory medium which is capable of storing or encoding a sequence of instructions for execution by the machine and that cause the machine to perform any one of the methodologies described herein. The terms "machine-readable medium" or "computer-readable medium" shall accordingly be taken to include, but not be limited to, solid-state memories, and optical or magnetic disks. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM's), read only memories (ROM's), and the like.

A software program may be launched from a non-transitory computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Certain systems, apparatus, applications, or processes described herein may be implemented as a number of subsystems, modules, or mechanisms. A subsystem, module, or mechanism is a unit of distinct functionality that can provide information to, and receive information from, other subsystems, modules, or mechanisms. Further, such a unit may be configurable to process data. Accordingly, subsystems, modules, or mechanisms may be regarded as being communicatively coupled. The subsystems, modules, or mechanisms be implemented as hardware circuitry, optical components, single or multi-processor circuits, memory circuits, software program modules and objects, firmware, and combinations thereof, as appropriate for particular implementations of various embodiments.

For example, one module may be implemented as multiple logical subsystems, modules, or mechanisms, or several subsystems, modules, or mechanisms may be implemented as a single logical subsystem, module, or mechanism. As another example, subsystems, modules, or mechanisms labeled as "first," "second," and "third," etc., may be implemented in a single subsystem, module, or mechanism, or some combination of subsystems, modules, or mechanisms, as would be understood by one of ordinary skill in the art.

In the foregoing Detailed Description, various features are grouped together in a single embodiment for streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate preferred embodiment.

The description includes references to the accompanying drawings, which form a part of the Detailed Description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

As used throughout this application, the word "may" is used in a permissive sense (e.g., meaning having the potential to), rather than the mandatory sense (e.g., meaning must). Similarly, the words "include", "including", and "includes" mean "including but not limited to." To facilitate understanding, like reference numerals have been used, where possible, to designate like elements common to the figures.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of calculating an insurance premium for a vehicle, the method comprising:
    monitoring, using an onboard vehicle system including a processor, at least one of a first amount of time a vehicle operator is in active control of a vehicle during a period and a second amount of time that the vehicle operates autonomously during the period;
    causing the onboard vehicle system to provide at least one signal indicative of a first amount of time a vehicle operator is in active control of the vehicle during the period;
    causing the onboard vehicle system to provide, by the at least one signal or another signal, a second amount of time that the vehicle operates autonomously during the period; and
    calculating, using an insurance premium calculator, an insurance rate based on the first amount of time and the second amount of time.

2. The method of claim 1, further comprising:
    causing the onboard vehicle system to provide an identity of the vehicle operator; and
    wherein calculating the insurance rate is further based on the identity of the vehicle operator.

3. The method of claim 1, further comprising:
    causing the onboard vehicle system to identify an occupant of the vehicle, wherein the occupant is not the vehicle operator, and wherein calculating the insurance rate for the subsequent period is based on the presence of the occupant.

4. The method of claim 1, further comprising:
    causing the onboard vehicle system to identify another operator of the vehicle, wherein the other operator is not the vehicle operator, and wherein calculating the insurance rate for the subsequent period is based on operation by the other operator.

5. The method of claim 1, further comprising causing the onboard vehicle system to detect that the vehicle operator is at least one of steering, braking, and accelerating the vehicle, wherein the at least one signal or the other signal indicative of the first amount of time comprises a notification that the vehicle operator is at least one of steering, braking, and accelerating the vehicle.

6. The method of claim 1, further comprising:
    receiving a command from the vehicle operator to override autonomous operation of the vehicle; and
    aggregating the amount of time the vehicle operator is in active control while the vehicle operator is overriding the autonomous operation.

7. The method of claim 1, wherein calculating the insurance rate comprises:
    accessing a first percentage of active control of the vehicle;
    calculating a second percentage of active control of the vehicle, wherein the second percentage is based on the amount of time the vehicle operator was in active control of the vehicle during the period; and
    increasing or decreasing the insurance rate based on a corresponding increase or decrease of the second percentage in comparison to the first percentage.

8. A non-transitory computer-readable medium hosted by an insurance company comprising instructions for calculating an insurance premium for a vehicle that when executed by a computer cause the computer to:
    monitor, using an onboard vehicle system including a processor, at least one of a first amount of time a vehicle operator is in active control of a vehicle during a period and a second amount of time that the vehicle operates autonomously during the period;
    cause the onboard vehicle system to provide at least one signal indicative of a first percentage of time a vehicle operator is in active control of the vehicle to the computer during the period;
    cause the onboard vehicle system to provide at least one signal indicative of a second percentage of time that the vehicle is operated autonomously to the computer during the period; and
    calculate an insurance rate based on the first percentage of time and the second percentage of time using the computer,
    the first percentage of time the vehicle operator is in active control of the vehicle, and
    the second percentage of time that the vehicle is operated autonomously.

9. The non-transitory computer-readable medium of claim 8, further comprising instructions that when executed by the computer cause the computer to:
    cause the onboard vehicle system to provide an identity of the vehicle operator; and
    wherein calculating the insurance rate is further based on the identity of the vehicle operator.

10. The non-transitory computer-readable medium of claim 8, further comprising instructions that when executed by the computer cause the computer to:
    cause the onboard vehicle system to identify an occupant of the vehicle, wherein the occupant is not the vehicle operator, and wherein calculating the insurance rate for the subsequent period is based on the presence of the occupant.

11. The non-transitory computer-readable medium of claim 8, wherein another insurance rate is calculated for another vehicle operator, and wherein the other insurance rate is based on an assumption regarding a proportion of time that the other vehicle operator is in active control of the vehicle.

12. The non-transitory computer-readable medium of claim 8, further comprising instructions to cause the onboard vehicle system to detect when the vehicle operator is in active control of the vehicle when the vehicle operator is performing at least one of steering, braking, and accelerating the vehicle and wherein the at least one signal indicative of the first percentage of time comprises a notification that the vehicle operator is at least one of steering, braking, and accelerating the vehicle.

13. The non-transitory computer-readable medium of claim 8, further comprising instructions that when executed by the computer cause the computer to:
  receive a command from the vehicle operator to override autonomous operation; and
  aggregate an amount of time the vehicle operator is in active control while the vehicle operator is overriding the autonomous operation.

14. A system for calculating an insurance premium for a vehicle and hosted by an insurance company, the system comprising:
  a processor; and
  a memory coupled to the processor, the memory containing instructions that when executed by the processor effectuate:
  an automobile automation component configured to:
    receive from an onboard vehicle system at least one of a first amount of time a vehicle operator is in active control of a vehicle during a period and a second amount of time that the vehicle operates autonomously during the period; and
    calculate an insurance rate based on both the first amount of time the vehicle operator is in active control of the vehicle and the second amount of time the vehicle is operated autonomously.

15. The system of claim 14, further comprising instructions that when executed by the processor cause the system cause the onboard vehicle system to detect when the vehicle operator is in active control of the vehicle when the vehicle operator is performing at least one of steering, braking, or accelerating the vehicle and wherein the at least one signal indicative of the first amount of time comprises a notification that the vehicle operator is at least one of steering, braking, and accelerating the vehicle.

16. The system of claim 14, wherein the memory includes instructions that when executed by the processor cause the system to:
  receive a command from the vehicle operator to override autonomous operation; and aggregate the amount of time the vehicle operator is in active control while the vehicle operator is overriding the autonomous operation.

17. The system of claim 14, wherein the memory includes instructions that when executed by the processor cause the system to:
  identify another operator of the vehicle, wherein the other operator is not the vehicle operator, wherein calculating the insurance rate for the subsequent period is based on operation by the other operator.

18. The system of claim 17, wherein identifying the other operator is performed at least in part using voice recognition.

19. The system of claim 17, wherein identifying the other operator is performed at least in part using fingerprint recognition.

20. The system of claim 17, wherein another insurance rate is calculated for another vehicle operator, and wherein the other insurance rate is based on an assumption regarding a proportion of time that the other vehicle operator is in active control of the vehicle.

* * * * *